US012320514B1

(12) United States Patent
Wang et al.

(10) Patent No.: US 12,320,514 B1
(45) Date of Patent: Jun. 3, 2025

(54) LIGHT-EMITTING STOVE DEVICE

(71) Applicant: Gang Liu, Foshan (CN)

(72) Inventors: Qiang Wang, Foshan (CN); Qiang Cao, Foshan (CN)

(73) Assignee: Gang Liu, Foshan (CN)

( * ) Notice: Subject to any disclaimer, the term of this patent is extended or adjusted under 35 U.S.C. 154(b) by 0 days.

(21) Appl. No.: 18/920,920

(22) Filed: Oct. 20, 2024

(30) Foreign Application Priority Data

Sep. 30, 2024 (CN) ........................ 202422410190.6

(51) Int. Cl.
*F21V 33/00* (2006.01)
*F21V 23/00* (2015.01)
*F21Y 103/10* (2016.01)
*F24C 15/06* (2006.01)

(52) U.S. Cl.
CPC ........ *F21V 33/0024* (2013.01); *F21V 23/003* (2013.01); *F24C 15/06* (2013.01); *F21Y 2103/10* (2016.08)

(58) Field of Classification Search
CPC ..... F21V 33/0024; F21V 33/003; F24C 15/06
See application file for complete search history.

(56) References Cited

U.S. PATENT DOCUMENTS 4,924,846 A * 5/1990 Peacock .................. F24C 15/06 126/41 R
2007/0207429 A1* 9/2007 Barker .................... F23N 1/002 431/328
2008/0115779 A1* 5/2008 Gibson ............... A47J 37/0713 126/201
2008/0163863 A1* 7/2008 Thomas .................. F24C 3/022 126/512
2008/0264408 A1* 10/2008 Konkle ................... F24C 3/006 126/519
2008/0308645 A1* 12/2008 Presley ................... F23D 14/20 29/428
2010/0062382 A1* 3/2010 Carey Stachowski ....................... F23D 14/105 431/299
2015/0253037 A1* 9/2015 Rumens .................. F24B 1/192 126/547
2018/0010807 A1* 1/2018 Brakhage ............... H04R 1/025

(Continued)

FOREIGN PATENT DOCUMENTS

CN 115388430 A 6/2021
CN 219318495 U 12/2022
CN 219607174 U 4/2023

*Primary Examiner* — Bryon T Gyllstrom
(74) *Attorney, Agent, or Firm* — Ricky Lam

(57) ABSTRACT

Disclosed is a light-emitting stove device. In the stove device, a light-emitting device is arranged on an inner side of a box body, and hollow pattern areas are arranged on side walls of the box body. Patterns in the pattern areas can be customized according to personal preferences and other elements. Both first light strips and second light strips in the light-emitting device can be mapped onto the pattern areas, such that a target pattern with a lighting effect can be formed. In combination with warm-toned lighting, an effect similar to that of a bonfire party can be created. In addition to a heating function of the stove, a unique festive atmosphere can be created through mapping of the hollow pattern areas. Further, the stove device is very simple and practical in use, requiring only a control device to control lighting and a combustion device.

11 Claims, 5 Drawing Sheets

(56) References Cited

U.S. PATENT DOCUMENTS

| | | | | |
|---|---|---|---|---|
| 2019/0383490 | A1* | 12/2019 | Paladino | F24B 1/192 |
| 2021/0063018 | A1* | 3/2021 | Widelitz | F24C 15/28 |
| 2024/0240798 | A1* | 7/2024 | Zhang | F24C 15/06 |
| 2024/0418372 | A1* | 12/2024 | Baird | F24B 1/18 |

* cited by examiner

LIGHT-EMITTING STOVE DEVICE

TECHNICAL FIELD

The present disclosure relates to the technical field of stoves, and in particular to a light-emitting stove device.

BACKGROUND

Stoves are widely used in winter and generally used indoor and outdoor. In an indoor mode without wind, a user can remove a stove cover to warm his/her hands directly. In an outdoor mode, in consideration of possible wind, a windshield is usually provided, and combustion in a stove core enables to heat a box body and the stove cover. However, stoves in the prior art have relatively single functions, and are particularly defective in creating an atmospheric experience. For bonfire parties in most indoor or outdoor areas, firewood cannot be directly burnt to create a bonfire atmosphere, thereby requiring improvements in this regard.

SUMMARY

In order to overcome the above defects in the prior art, an objective of the present disclosure is to provide a light-emitting stove device, so as to solve the technical problems mentioned in the Background.

In order to solve the technical problems, the present disclosure is achieved by means of the following technical solution:

a light-emitting stove device, including:

a box body, where the box body is provided with a top wall and side walls, the top wall is provided with a supporting groove for embedding a combustion device, and each of the side walls is provided with a pattern area formed by hollowing or etching;

a combustion device, where the combustion device is installed in the supporting groove of the top wall of the box body and allows combustion with fuel gas or firewood;

a light-emitting device, where the light-emitting device is installed on an inner side or an outer side of the box body and is capable of mapping light towards the pattern areas or an external environment; and a control device, where the control device is installed on one side of the box body and is capable of controlling opening and closing of both the light-emitting device and the combustion device via wired or wireless means.

Specifically, the light-emitting device includes first light strips, and the first light strips are installed at positions of upper inner sides of the side walls of the box body close to the top wall.

Specifically, a bottom of each of the side walls of the box body is further provided with a supporting wall, and the light-emitting device includes first light strips and second light strips, where the first light strips are installed at positions of upper inner sides of the side walls of the box body close to the top wall, and the second light strips are installed on outer sides of the supporting walls.

Specifically, a bottom of each of the side walls of the box body is further provided with a supporting wall, the light-emitting device includes second light strips, and the second light strips are installed on outer sides of the supporting walls.

Specifically, the combustion device includes a stove core, a combustion tube and an ignition device, where the stove core is embedded in the supporting groove, the combustion tube is fixed in the stove core through a fixed bracket, the ignition device is arranged on one side of the combustion tube to ignite the combustion tube and trigger combustion, and an upper end of the stove core is further covered with a stove cover.

Specifically, one side of the box body is provided with a switch groove, the control device is installed in the switch groove, and the control device includes an ignition switch and a lamp switch, where the ignition switch controls the opening and closing of the combustion device, and the lamp switch controls the opening and closing of the light-emitting device.

Specifically, upper and lower ends of the switch groove are provided with an upper inclined plane and a lower inclined plane respectively.

Specifically, the supporting groove is provided with an inner support edge, an outer support edge is arranged at a position of the stove core corresponding to the inner support edge, and the stove core is placed in the supporting groove by means of embedded snapping positions of the outer support edge and the inner support edge.

Specifically, the supporting groove can be one or a combination of more of a circular shape, a rectangular shape, an elliptical shape, a diamond shape, a triangular shape, or any other polygonal shape, and the stove core corresponds to the supporting groove in shape.

Specifically, an inner side of the stove cover is provided with a handle, and the stove cover also corresponds to the stove core in shape.

Specifically, a windshield is arranged between the stove cover and the stove core, the windshield is provided with ventilation holes, and the inner support edge is located at an inner side of the windshield.

A light-emitting stove device, includes:

a box body, where the box body is provided with a top wall and side walls, and the top wall is provided with a supporting groove for embedding a combustion device;

a combustion device, where the combustion device is installed in the supporting groove of the top wall of the box body and allows combustion with fuel gas or firewood;

a light-emitting device, where the light-emitting device is installed on an inner side or an outer side of the box body and is capable of mapping light towards an external environment; and a control device, where the control device is installed on one side of the box body and is capable of controlling opening and closing of both the light-emitting device and the combustion device via wired or wireless means.

Specifically, a bottom of each of the side walls of the box body is further provided with a supporting wall, the light-emitting device includes second light strips, and the second light strips are installed on outer sides of the supporting walls.

Compared with the prior art, the present disclosure has the beneficial effects as follows:

In the stove device, a light-emitting device is arranged on an inner side of a box body, and hollow pattern areas are arranged on side walls of the box body. Patterns in the pattern areas can be customized according to personal preferences and other elements, such as Christmas elements or New Year elements. Both first light strips and second light strips in the light-emitting device can be mapped onto the pattern areas, such that a target pattern with a lighting effect can be formed. In an aspect, in combination with warm-toned lighting, an effect similar to that of a bonfire party can be created. In a further aspect, in addition to a heating function of the stove, a unique festive atmosphere can be created through mapping of the hollow pattern areas. Further, the stove device is very simple and practical in use, requiring only a control device to control lighting and a combustion device.

Figure 1:
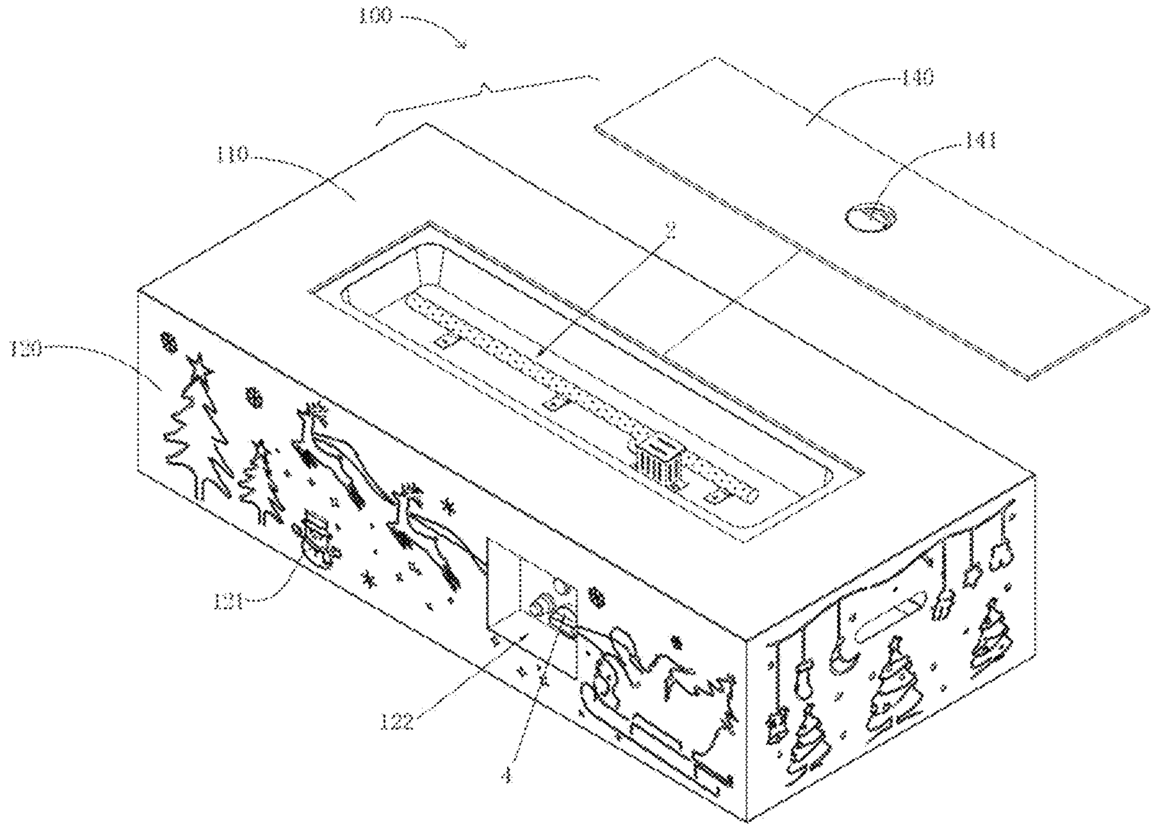
FIG. 1 is an exploded view I of an overall structure of a stove with a rectangular or square stove core according to an example of the present disclosure.
Figure 2:
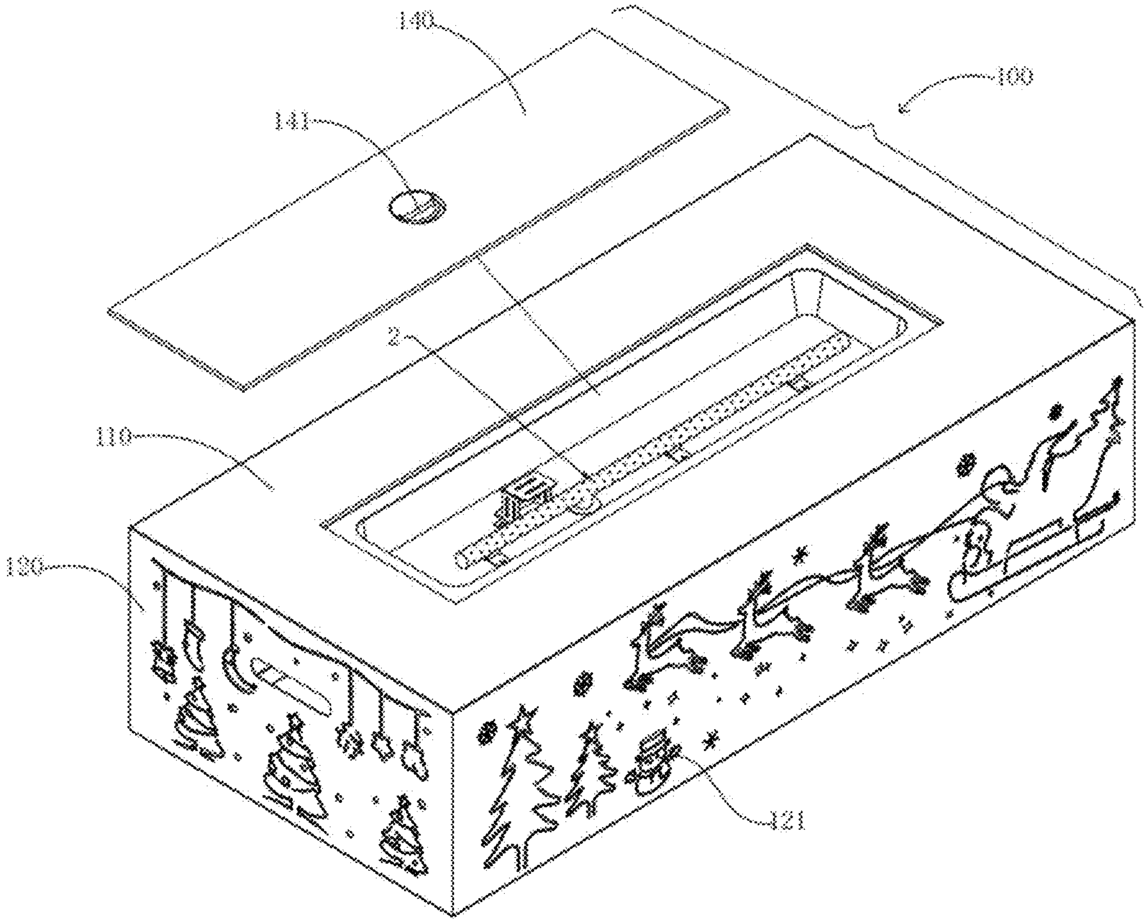
FIG. 2 is an exploded view II of an overall structure of a stove with a rectangular or square stove core according to an example of the present disclosure.
Figure 3:
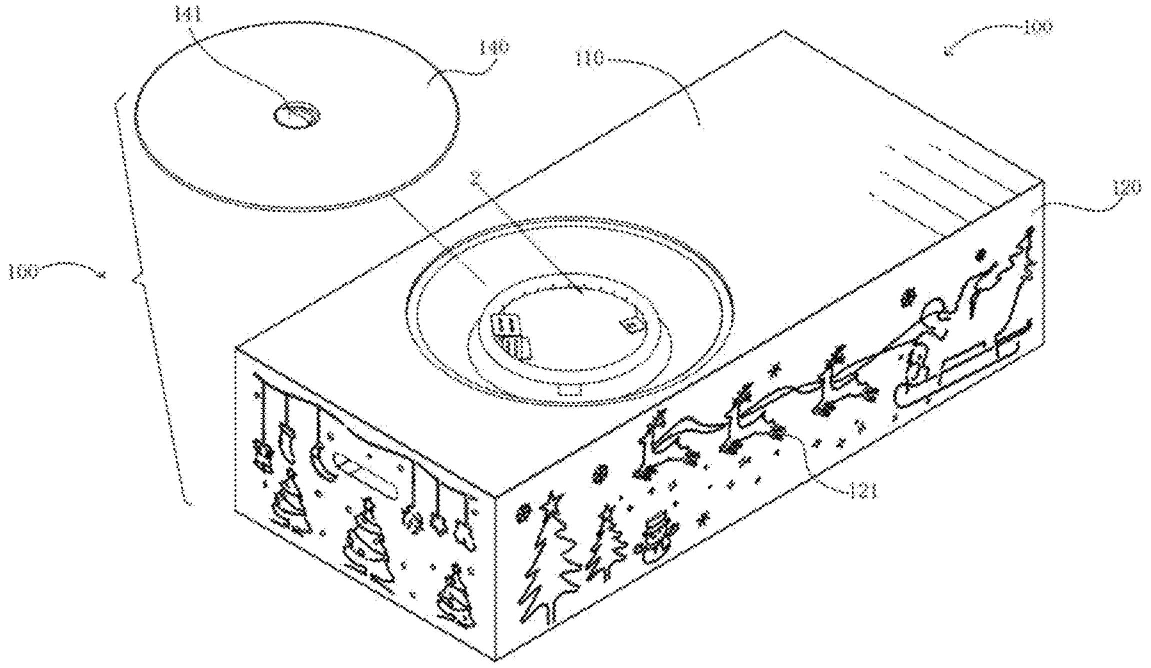
FIG. 3 is an exploded view of an overall structure of a stove with a circular stove core according to an example of the present disclosure.

In the figures: box body 100, top wall 110, supporting groove 111, side wall 120, pattern area 121, combustion device 2, light-emitting device 3, control device 4, first light strip 31, supporting wall 130, second light strip 32, stove core 21, combustion tube 22, ignition device 23, ignition switch 41, stove cover 140, switch groove 122, lamp switch 42, upper inclined plane **122*a*, lower inclined plane 122*b*, inner support edge 111*a*, outer support edge 211, handle 141, windshield 150, ventilation hole 151, and fixed bracket 221**.

DETAILED DESCRIPTIONS OF THE EMBODIMENTS

The present disclosure will be further described below with reference to the accompanying drawings and specific implementations. It should be noted that, various embodiments or technical features described below can be arbitrarily combined to form new embodiments without conflicts.

Referring to FIGS. 1-8:

A light-emitting stove device includes a box body 100, a combustion device 2, a light-emitting device 3, and a control device 4. The box body 100 is provided with a top wall 110 and side walls 120, and the box body 100 can be rectangular, triangular, circular, oval, or in any other polygonal shape. Taking a rectangular or square shape as an example, the box body 100 is provided with a front wall, a rear wall, a left wall and a right wall, as well as a top wall 110, where the top wall 110 is provided with a supporting groove 111 for embedding the combustion device 2. Each of the side walls 120 is provided with a pattern area 121, and the pattern areas 121 are formed preferably by a hollowing process, where the hollowing process can be implemented by etching or carving. Preferably, the pattern areas 121 are located on the four side walls 120 and exhibit hollow patterns, and pattern elements can vary greatly and be customized according to different preferences and holiday topics, such as Christmas-themed pattern elements specially designed for Christmas. The combustion device 2 is installed in the supporting groove 111 of the top wall 110 and allows combustion with fuel gas. In some cases, the combustion device 2 may also serve as a stove capable of directly burning firewood. The light-emitting device 3 is installed on an inner side or an outer side of the box body 100 and is capable of mapping light towards the pattern areas 121 or an external environment. When the light-emitting device 3 is installed on the inner side of the box body 100, light can be mapped outward through the pattern areas 121, which creates a unique festive atmosphere or light patterns available for people to watch and enjoy easily. When the light-emitting device 3 is installed on the outer side of the box body 100, preferably at a bottom position of an outer side of the side wall 120, light can be directly emitted into the external environment, and a bonfire party-like lighting effect can be achieved. Preferably, the light-emitting device 3 adopts warm-toned LED lamps, and the control device 4 is installed on one side of the box body 100 and is capable of controlling opening and closing of both the light-emitting device 3 and the combustion device 2 via wired or wireless means (such as Bluetooth). When firewood is selected as fuel, the opening and closing of the combustion device 2 can be manually controlled. The stove device of the present disclosure is no longer simple in functionality, has features of light modeling and pattern projection, and is capable of creating a unique festive or bonfire party-like effect, thereby enhancing user experience in use of indoor or outdoor stove products.

The box body 100 can be made of a light-blocking metal material, such as aluminum alloy, or can be made of a high-temperature resistant transparent material, such as fireproof glass. The pattern areas 121 can be designed in different ways. In a preferred embodiment, the pattern areas 121 are located on the box body 100 and formed in a light-blocking manner. When the light-blocking manner is adopted for formation thereof, a light-transmitting manner is adopted for other non-pattern areas. In other optional embodiments, the pattern areas 121 are located on the box body 100 and formed in a non-light-blocking manner, and when the non-light-blocking manner is adopted for formation thereof, a non-light-transmitting manner is adopted for other non-pattern areas. The above formation refers to a process of displaying designed patterns on the box body 100 by means of etching or carving.

Figure 4:
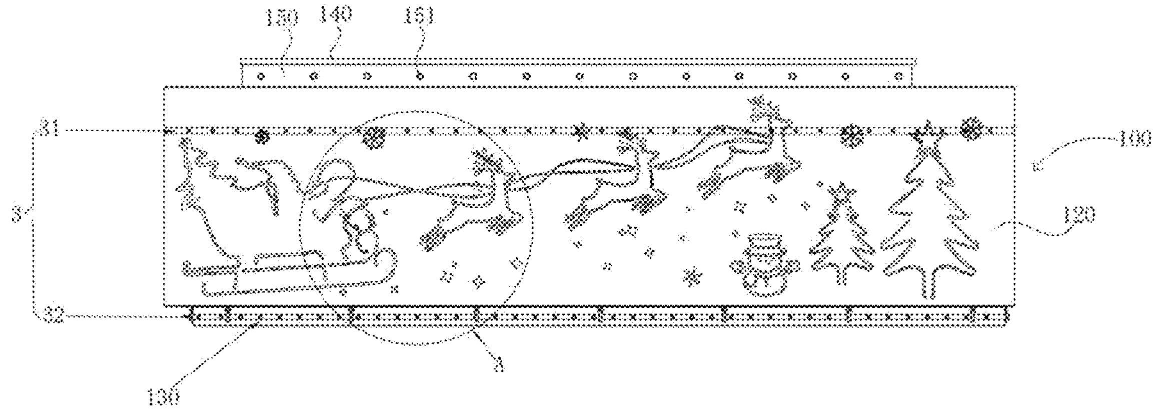
FIG. 4 is a front view of an overall structure of the present disclosure.
Figure 5:
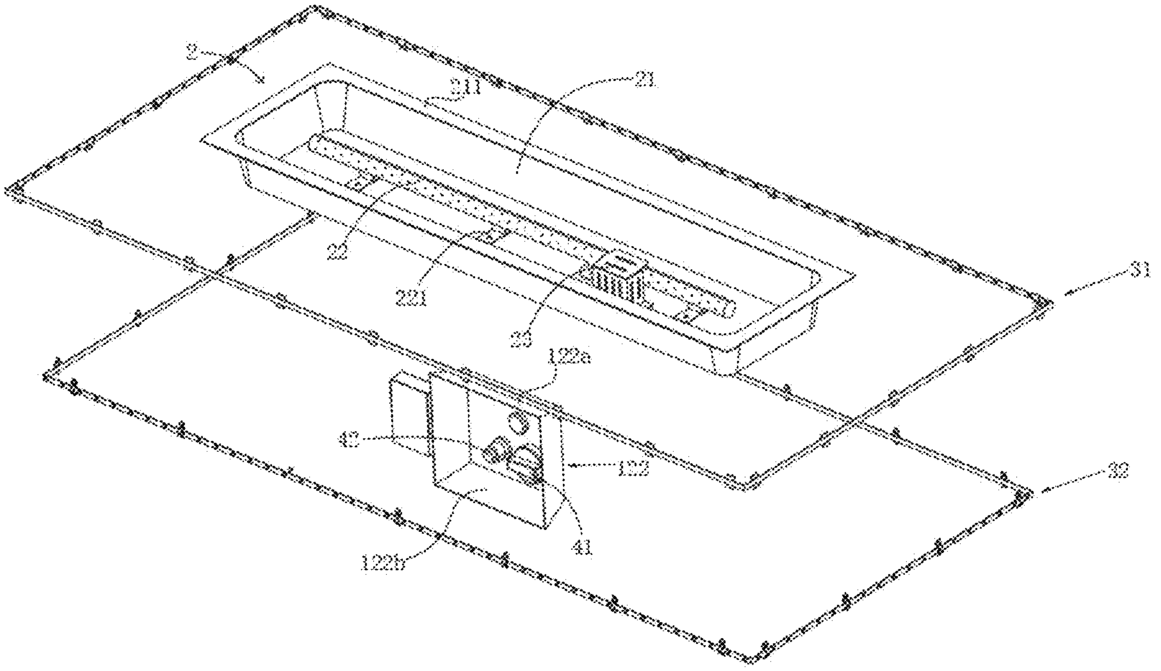
FIG. 5 is an exploded view of a structure of a combustion device, a light-emitting device and a switch groove of the present disclosure.

With reference to FIGS. 4 and 5, in a preferred example, the light-emitting device 3 includes first light strips 31, and the first light strips 31 are installed at positions of upper inner sides of the side walls 120 close to the top wall 110. In this example, the first light strips 31 cooperate with the hollow pattern areas 121 on the side walls 120, and light is emitted from inside and is transmitted outward through the hollow patterns, so as to create a unique festive atmosphere for people.

Figure 7:
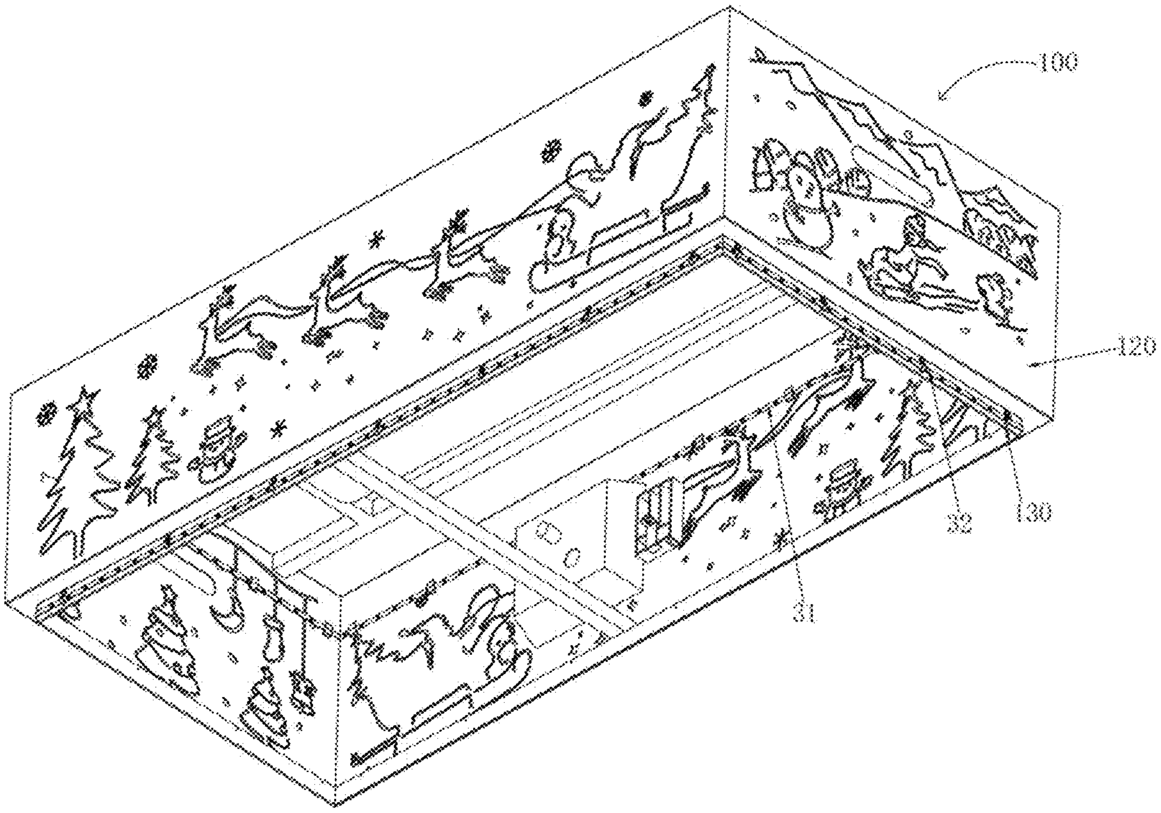
FIG. 7 is a space diagram of a bottom of an overall structure of a stove with a rectangular or square stove core according to an example of the present disclosure.
Figure 8:
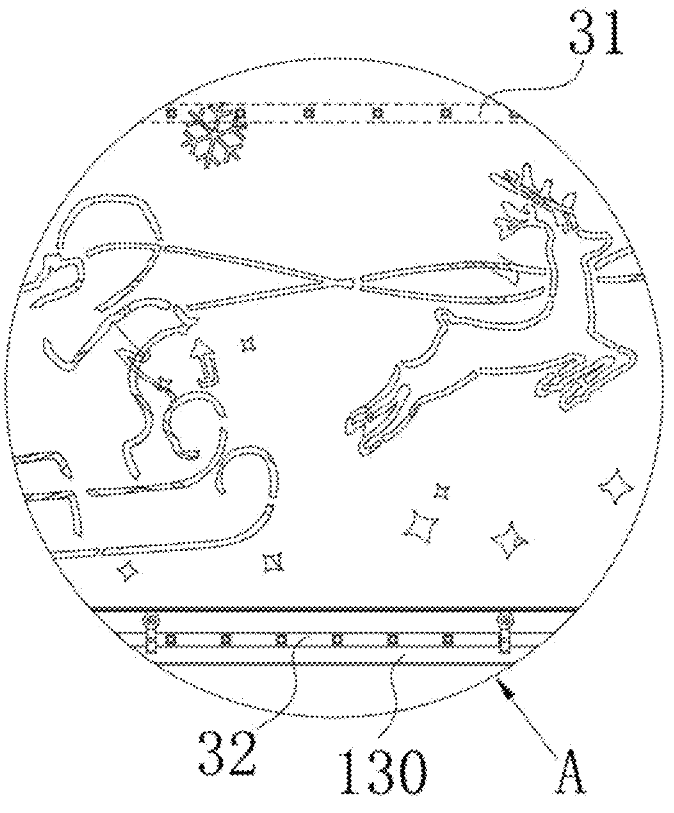
FIG. 8 is an enlarged view of a portion A shown in FIG. 4.

In another preferred example, with reference to FIGS. 4 and 7, a bottom of each of the side walls 120 is further provided with a supporting wall 130, and the supporting walls 130 and the side walls 120 can be integrally formed by die-casting or bending in a production process. Generally speaking, taking a square box body as an example, a diameter of a closed rectangle enclosed by the side walls 120 is larger than that of a closed rectangle enclosed by the supporting walls 130. In this example, the light-emitting device 3 includes first light strips 31 and second light strips 32, where the first light strips 31 are installed at positions of upper inner sides of the side walls 120 of the box body 100 close to the top wall 110, and the second light strips 32 are installed on outer sides of the supporting walls 130, which is different from the previous example with a single kind of light strips, that is, in this example, two kinds of light strips are provided. Specifically, the first light strips 31 located on the inner sides of the side walls 120 are responsible for mapping the pattern areas 121, and the second light strips 32 on the outer sides of the supporting walls 130 are responsible for illuminating an external environment or creating a bonfire party effect. Of course, residual light can also be used to illuminate the pattern areas 121, and as part of the prior art, the second light strips 32 can be composed of colored or monochrome lamps, and flashing or non-flashing can be selected as a light-emitting mode.

In more preferred examples, with reference to FIGS. 4 and 7, a bottom of each of the side walls 120 of the box body 100 is further provided with a supporting wall 130, the light-emitting device 3 includes second light strips 32, and the second light strips 32 are installed on outer sides of the supporting walls 130. This example differs from the previous two examples in that only the second light strips 32 are installed on the outer sides of the supporting walls 130, which only satisfies needs of some customers for illuminating partially and creating a bonfire party effect.

Specifically, with reference to FIG. 5, the combustion device 2 includes a stove core 21, a combustion tube 22 and an ignition device 23. The stove core 21 is embedded in the supporting groove 111, and the combustion tube 22 is fixed in the stove core 21 through a fixed bracket 221. The fixed bracket 221 can be Z-shaped, C-shaped or Y-shaped, a lower end of the fixed bracket 221 is fixed to the stove core 21, and an upper end of the fixed bracket 221 supports and fixes the combustion tube 22. The ignition device 23 is arranged on one side of the combustion tube 22 to ignite the combustion tube 22 and trigger combustion. An upper end of the stove core 21 is further covered with a stove cover 140. The combustion tube 22 located inside the stove core 21 is a site where combustion occurs, and combustion energy is supplied by a gas tank through piping or directly supplied through a natural gas pipeline. The ignition device 23 can be a spark ignition device in the prior art, and the stove core 21 is preferably made of a high-temperature resistant metal or ceramic material.

Specifically, with reference to FIGS. 1 and 5, one side of the box body 100 is provided with a switch groove 122, and the control device 4 is installed in the switch groove 122. The control device 4 includes an ignition switch 41 and a lamp switch 42, where the ignition switch 41 controls the opening and closing of the combustion device 2, and the lamp switch 42 controls the opening and closing of the light-emitting device 3. In other preferred examples, the control device 4 can be integrated on a main control panel, the main control panel is electrically connected to the ignition switch 41 and the lamp switch 42, and the opening and closing of the combustion device 2 and the light-emitting device 3 can be controlled via a Bluetooth switch (or via a remote control or integrated into a mobile terminal). In this case, supply and shutoff of gas in a gas pipeline can be controlled via a solenoid valve and the like. Specifically, to enable outdoor use even in rainy days, to prevent rainwater from accumulating in the switch groove 122, and to provide more space for manually operating a switch button, upper and lower ends of the switch groove 122 are provided with an upper inclined plane **122*a* and a lower inclined plane 122*b*** respectively, and in individual cases, and can be further provided with a left inclined plane and a right inclined plane.

Figure 6:
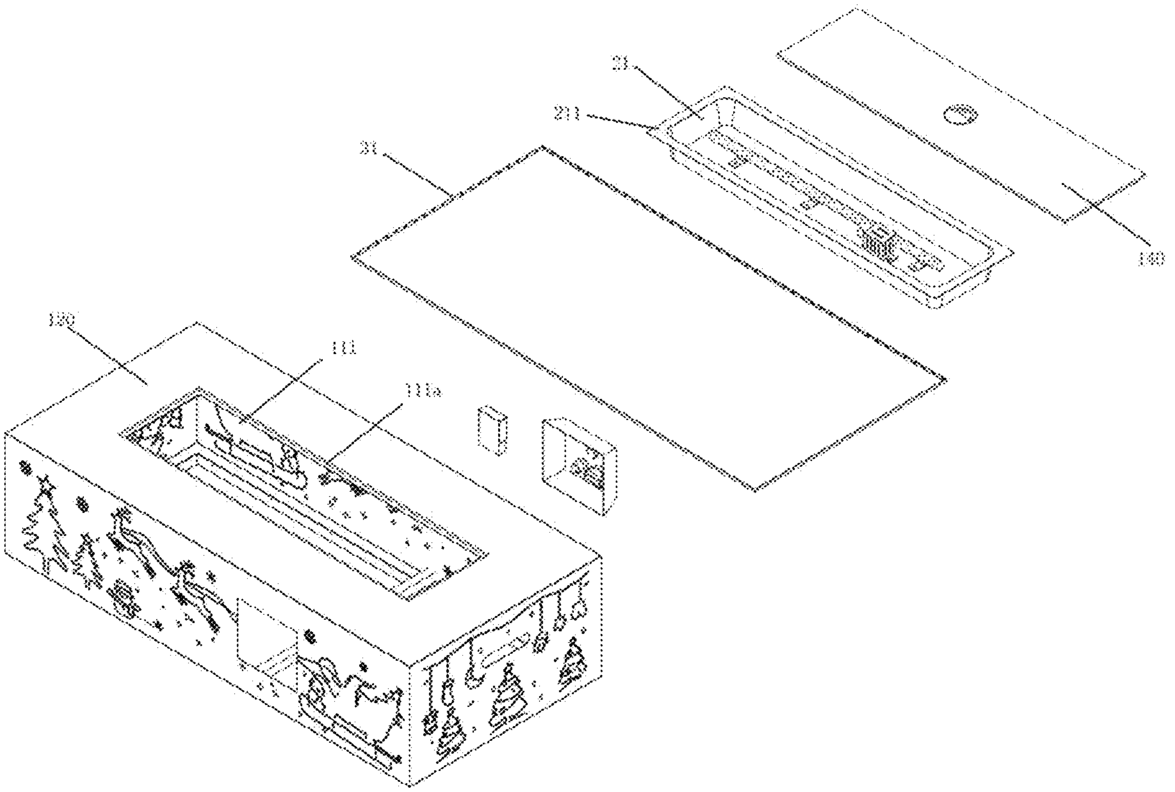
FIG. 6 is an exploded view III of an overall structure of a stove with a rectangular or square stove core according to an example of the present disclosure.

Specifically, with reference to FIGS. 5 and 6, the supporting groove 111 is provided with an inner support edge **111*a*, and an outer support edge 211 is arranged at a position of the stove core 21 corresponding to the inner support edge 111*a*. The stove core 21 is placed in the supporting groove 111 by means of embedded snapping positions of the outer support edge 211 and the inner support edge 111*a*. The inner support edge 111*a* and an upper end plane of the top wall 110 present a concave-down step shape, which facilitates insertion of the outer support edge 211 of the stove core 21. Further, the stove cover 140 needs to cover the stove core 21, and a same inner support edge 111*a* can also be arranged on an inner side of the stove core 21. Specifically, the supporting groove 111 can be one or a combination of more of a circular shape, a rectangular shape, an elliptical shape, a diamond shape, a triangular shape, or any other polygonal shape. The stove core 21 corresponds to the supporting groove 111 in shape. To facilitate lifting of the stove cover 140, an inner side of the stove cover 140 is provided with a handle 141, the handle 141 is usually embedded in a groove when not in use, and the handle 141 is of a semi-circular arc shape and is hinged with a groove on the stove cover 140. The groove is usually mounted at a central point of the stove cover 140, which can be hooked up when needed, and the stove cover 140 also corresponds to the stove core 21** in shape.

Specifically, with reference to FIG. 4, to overcome the defect that wind easily extinguishes a flame during normal outdoor use, a solution is provided, that is, a windshield 150 is arranged between the stove cover 140 and the stove core 21. The windshield 150 is of a ring shape equivalent to that of the supporting groove 111, and arranged between the stove cover 140 and the stove core 21. The windshield 150 is provided with ventilation holes 151, and an inner side of the windshield 150 is also provided with an inner support edge **111*a*. Preferably, the ventilation holes 151 are distributed on the windshield 150 in a non-convective manner. To ensure sufficient oxygen supply for combustion and prevent wind from extinguishing the flame due to convection, the windshield 150, in some cases, can be integrated on the stove cover 140, or the windshield 150 can be omitted directly. Instead, oxygen can be supplied from gaps at a bottom of the box body 100**.

The present disclosure further discloses a light-emitting stove device, and the device includes a box body 100, a combustion device 2, a light-emitting device 3, and a control device 4. The box body 100 is provided with a top wall 110 and side walls 120, and the top wall 110 is provided with a supporting groove 111 for embedding the combustion device 2. The combustion device 2 is installed in the supporting groove 111 of the top wall 110 of the box body 100 and allows combustion with fuel gas. The light-emitting device 3 is installed on an inner side or an outer side of the box body 100, and is capable of mapping light towards an external environment. The control device 4 is installed on one side of the box body 100 and is capable of controlling opening and closing of both the light-emitting device 3 and the combustion device 2 via wired or wireless means. A bottom of each of the side walls 120 of the box body 100 is further provided with a supporting wall 130, the light-emitting device 3 includes second light strips 32, and the second light strips 32 are installed on outer sides of the supporting walls 130.

The above embodiments are merely preferred embodiments of the present disclosure and are not intended to limit the scope of protection of the present disclosure. Any non-substantial changes and substitutions made by those skilled in the art based on the present disclosure fall within the scope of protection of the present disclosure.

What is claimed is:

1. A light-emitting stove device, comprising:

a box body, wherein the box body is provided with a top wall and side walls, the top wall is provided with a supporting groove for embedding a combustion device, and each of the side walls is provided with a pattern area;

a combustion device, wherein the combustion device is installed in the supporting groove of the top wall of the box body and allows combustion with fuel gas or firewood;

a light-emitting device, wherein the light-emitting device is installed on an inner side or an outer side of the box body and is capable of mapping light towards the pattern areas or an external environment; and a control device, wherein one side of the box body is provided with a switch groove, the control device is installed in the switch groove, and the control device comprises an ignition switch and a lamp switch, wherein the ignition switch controls the combustion device to switch on or off, and the lamp switch controls the light-emitting device to switch on or off.

2. The light-emitting stove device according to claim 1, wherein the light-emitting device comprises first light strips, and the first light strips are installed at positions of upper inner sides of the side walls of the box body close to the top wall.

3. The light-emitting stove device according to claim 1, wherein a bottom of each of the side walls of the box body is further provided with a supporting wall, and the light-emitting device comprises first light strips and second light strips, wherein the first light strips are installed at positions of upper inner sides of the side walls of the box body close to the top wall, and the second light strips are installed on outer sides of the supporting walls.

4. The light-emitting stove device according to claim 1, wherein a bottom of each of the side walls of the box body is further provided with a supporting wall, the light-emitting device comprises second light strips, and the second light strips are installed on outer sides of the supporting walls.

5. The light-emitting stove device according to claim 1, wherein the combustion device comprises a stove core, a combustion tube and an ignition device, wherein the stove core is embedded in the supporting groove, the combustion tube is fixed in the stove core through a fixed bracket, the ignition device is arranged on one side of the combustion tube to ignite the combustion tube and trigger combustion, and an upper end of the stove core is further covered with a stove cover.

6. The light-emitting stove device according to claim 5, wherein the supporting groove is provided with an inner support edge, an outer support edge is arranged at a position of the stove core corresponding to the inner support edge, and the stove core is placed in the supporting groove by means of embedded snapping positions of the outer support edge and the inner support edge.

7. The light-emitting stove device according to claim 6, wherein the supporting groove can be one or a combination of more of a circular shape, a rectangular shape, an elliptical shape, a diamond shape, a triangular shape, or any other polygonal shape, and the stove core corresponds to the supporting groove in shape.

8. The light-emitting stove device according to claim 7, wherein an inner side of the stove cover is provided with a handle, and the stove cover also corresponds to the stove core in shape.

9. The light-emitting stove device according to claim 8, wherein a windshield is arranged between the stove cover and the stove core, the windshield is provided with ventilation holes, and the inner support edge is located at an inner side of the windshield.

10. The light emitting stove device according to claim 1, wherein upper and lower ends of the switch groove are provided with an upper inclined plane and a lower inclined plane respectively.

11. A light-emitting stove device, comprising:

a box body, wherein the box body is provided with a top wall and side walls, and the top wall is provided with a supporting groove for embedding a combustion device;

a combustion device, wherein the combustion device is installed in the supporting groove of the top wall of the box body and allows combustion with fuel gas or firewood;

a light-emitting device, wherein the light-emitting device is installed on an inner side or an outer side of the box body and is capable of mapping light towards an external environment; and a control device, wherein the control device is installed on one side of the box body and is capable of controlling both the light-emitting device and the combustion device via wired or wireless means to switch on or off, wherein a bottom of each of the side walls of the box body is further provided with a supporting wall, the light-emitting device comprises second light strips, and the second light strips are installed on outer sides of the supporting walls.

* * * * *